(12) United States Patent
Abdelbaky

(10) Patent No.: US 10,201,170 B1
(45) Date of Patent: Feb. 12, 2019

(54) FROZEN DESERT HOLDER

(71) Applicant: Mohamed Abdelbaky, Valencia, CA (US)

(72) Inventor: Mohamed Abdelbaky, Valencia, CA (US)

( * ) Notice: Subject to any disclaimer, the term of this patent is extended or adjusted under 35 U.S.C. 154(b) by 0 days.

(21) Appl. No.: 15/950,948

(22) Filed: Apr. 11, 2018

Related U.S. Application Data

(60) Provisional application No. 62/484,305, filed on Apr. 11, 2017.

(51) Int. Cl.
*B25B 29/00* (2006.01)
*A23G 9/50* (2006.01)
*B65D 85/78* (2006.01)

(52) U.S. Cl.
CPC ............ *A23G 9/503* (2013.01); *B65D 85/78* (2013.01)

(58) Field of Classification Search
CPC ................................. A23G 9/503; B65G 85/78
USPC ............... 294/131, 99.1, 99.2; 426/134, 139
See application file for complete search history.

(56) References Cited

U.S. PATENT DOCUMENTS

| | | | | |
|---|---|---|---|---|
| 1,548,970 A | * | 8/1925 | York | B65D 85/78 |
| | | | | 294/5.5 |
| 1,652,789 A | * | 12/1927 | Moore | A23G 9/506 |
| | | | | 426/134 |
| 1,844,066 A | * | 2/1932 | Hughes | B65D 5/2038 |
| | | | | 206/525 |
| 2,039,830 A | * | 5/1936 | Owens | A23G 9/503 |
| | | | | 229/101.1 |
| 2,321,519 A | | 5/1941 | Rubinoff | |
| 2,450,364 A | * | 9/1948 | Smith | B65D 85/78 |
| | | | | 229/87.08 |
| 2,557,602 A | * | 6/1951 | Huitt | A23G 9/288 |
| | | | | 229/87.08 |
| 2,735,778 A | * | 2/1956 | Taylor | A23G 9/503 |
| | | | | 426/110 |
| 3,459,296 A | | 8/1969 | Berg | |
| D390,335 S | * | 2/1998 | Carrick | D1/102 |
| 5,770,250 A | | 6/1998 | Smith | |
| 7,165,270 B2 | * | 1/2007 | DeYoung | A41D 13/087 |
| | | | | 2/16 |
| 2009/0068324 A1 | * | 3/2009 | Sandoval | A23G 9/503 |
| | | | | 426/134 |
| 2012/0058218 A1 | * | 3/2012 | Blondeau | A23G 9/503 |
| | | | | 426/2 |

* cited by examiner

*Primary Examiner* — Paul T Chin
(74) *Attorney, Agent, or Firm* — Kenneth L. Green; Averill and Green

(57) ABSTRACT

A frozen desert holder holds flat for carrying in a purse or bag, and includes two opposing flaps which fold out above a handle portion. The handle portion includes a vertical passage for an ice cream stick, and the flaps catch drips which otherwise would fall onto a consumer's hand. The holder may be made from an absorbent biodegradable material having a water impermeable material backing.

15 Claims, 2 Drawing Sheets

FROZEN DESERT HOLDER

CROSS-REFERENCE TO RELATED APPLICATIONS

The present application claims the priority of U.S. Provisional Patent Application Ser. No. 62/484,305 filed Apr. 11, 2017, which application is incorporated in its entirety herein by reference.

BACKGROUND OF THE INVENTION

The present invention relates to food holders and in particular to a folding holder for frozen desert on a stick.

Children and adults often enjoy consuming a frozen desert held by a flat stick, commonly called an ice cream stick. Unfortunately, the frozen deserts may quick melt and drip onto the consumer's hand or clothing. Known frozen desert holders include a horizontal portion and a vertical stick holder and are not suitable for carrying in a purse or similar article.

BRIEF SUMMARY OF THE INVENTION

The present invention addresses the above and other needs by providing a frozen desert holder which holds flat for carrying in a purse or bag, and includes two opposing flaps which fold out above a handle portion. The handle portion includes a vertical passage for an ice cream stick, and the flaps catch drips which otherwise would fall onto a consumer's hand. The holder may be made from an absorbent biodegradable material having a water impermeable material backing.

In accordance with one aspect of the invention, there is provided a folding frozen desert holder. The holder includes flaps attached to a handle. The flaps may be folded together to provide a flat configuration for easy storage in a purse or bag.

In accordance with another aspect of the invention, there is provided an absorbent frozen desert holder. The absorbent material absorbs drips from the frozen desert preventing the drips from running off the folded flaps and onto a consumer's hand or clothing.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figures 1, 2:
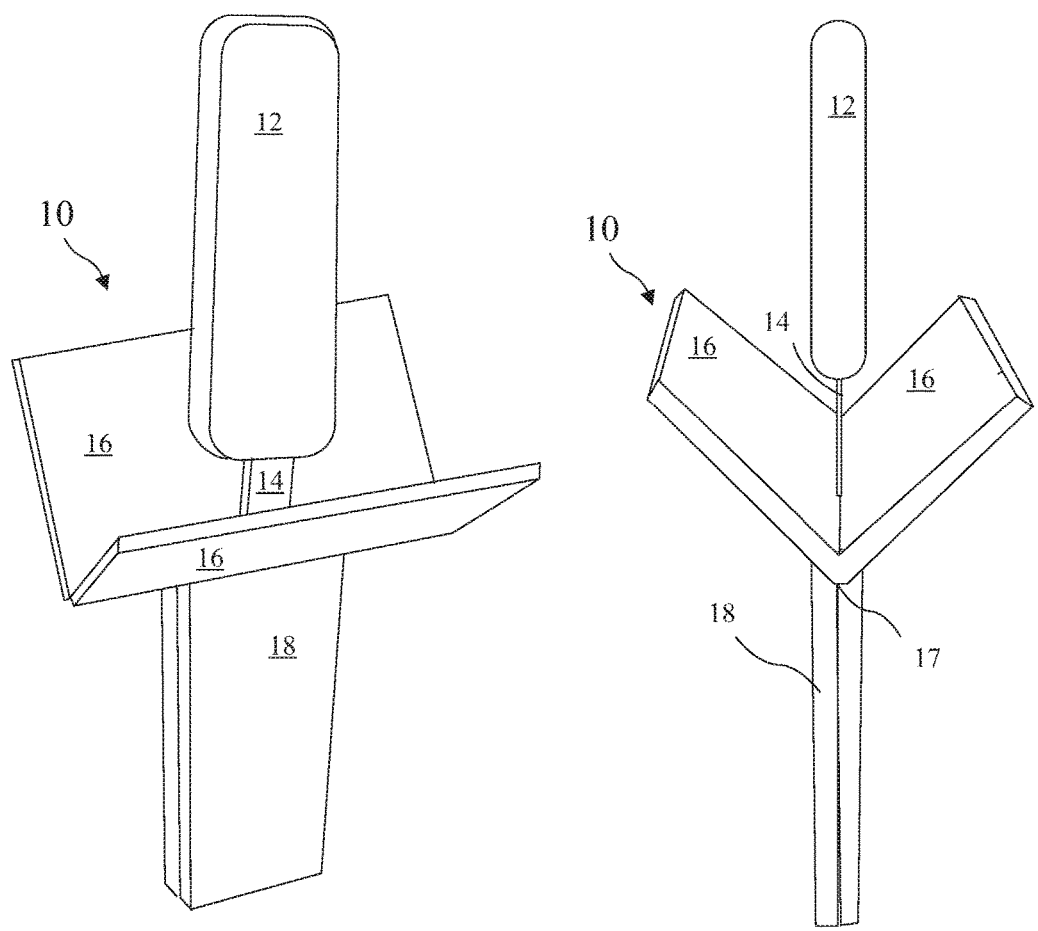
FIG. 1 is a front quarter perspective view of a frozen desert holder according to the present invention, holding a frozen desert.
FIG. 2 is a front perspective view of the frozen desert holder according to the present invention, holding a frozen desert.

A front quarter perspective view of a frozen desert holder 10 according to the present invention, holding a frozen desert 12, is shown in FIG. 1 and a front perspective view of the frozen desert holder 10, holding a frozen desert 12, is shown in FIG. 2. The frozen desert holder 10 includes a holding portion (or handle) 18 and one or two folding flaps 16 attached to a top edge 17 of the holding portion 18. The flaps 16 may be folded together (see FIG. 4) for carrying in a purse, bag, or the like, and may be folded out (see FIG. 5) for use to catch dripping from the frozen desert 12. The holding portion 18 may be tapered as shown, or straight.

Figures 3, 4, 5:
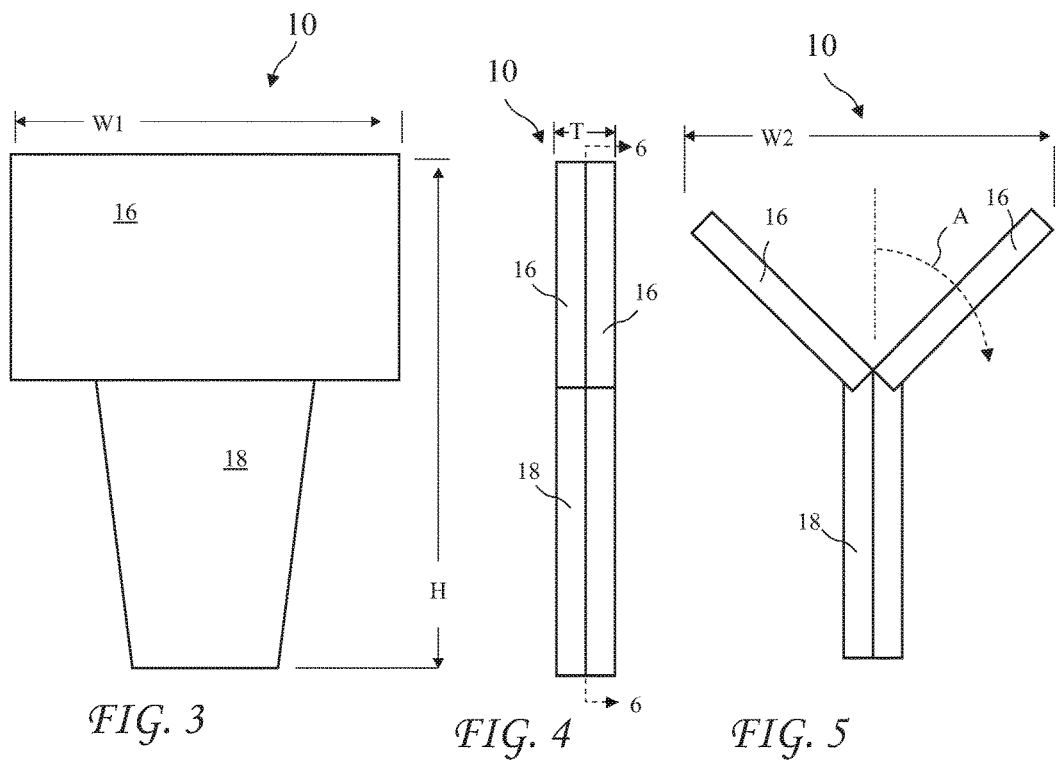
FIG. 3 is a front view of the frozen desert holder according to the present invention.
FIG. 4 is a side view of the frozen desert holder according to the present invention with flaps folded for storing.
FIG. 5 is a side view of the frozen desert holder according to the present invention with flaps open for use.

A front view of the frozen desert holder 10 is shown in FIG. 3, a side view of the frozen desert holder 10 is shown in FIG. 4 with flaps 16 closed for storing or carrying, and a side view of the frozen desert holder 10 is shown in FIG. 5 with flaps 16 open for use. The frozen desert holder 10 has a thickness T of between ¼ and ½ inches, a height H of between three and seven inches and a width W1 of between two and six inches. The flaps 16 fold out to an angle A of preferably between 45 and 90 degrees to a width W2 preferably between two and six inches.

Figure 6:
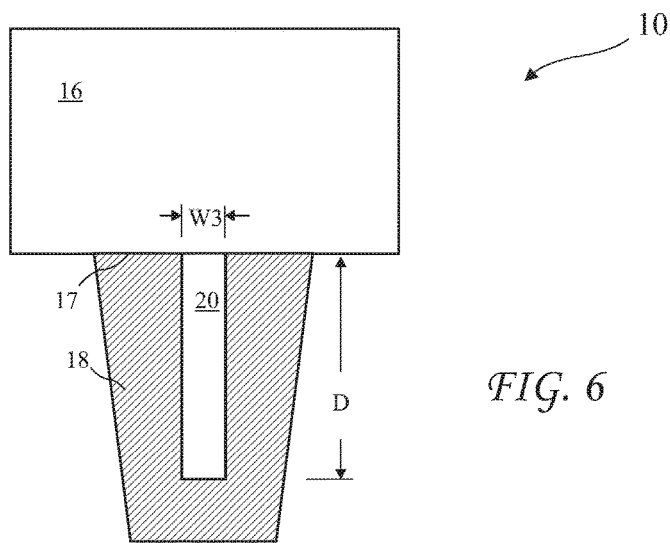
FIG. 6 is a cross-sectional view of the frozen desert holder according to the present invention taken along line 6-6 of FIG. 4.

A cross-sectional view of the frozen desert holder taken along line 6-6 of FIG. 4 is shown in FIG. 6. The holding portion 18 includes a slot 10 reaching down from the top 17 a depth D of between two and three inches and has a width W3 of between ¼ and ⅜ inches, and the slot 20 is configured to snugly hold an ice cream stick.

The frozen desert holder 10 is preferably made from cardboard, and more preferably from an absorbent biodegradable material having a water impermeable material backing.

While the invention herein disclosed has been described by means of specific embodiments and applications thereof, numerous modifications and variations could be made thereto by those skilled in the art without departing from the scope of the invention set forth in the claims.

I claim:

1. A frozen desert holder, comprising:
    a flat holding portion having a top edge;
    a vertical passage extending down through the top edge in the flat holding portion, the vertical passage configured to hold an ice cream stick of a frozen desert; and
    a folding portion pivotally attached to the flat holding portion along the top edge, the folding portion foldable to reside in a same plane as the flat holding portion, and foldable to extend laterally to block drips from a frozen desert held in the vertical passage from dripping onto a consumers hand.

2. The holder of claim 1, wherein the folding portion comprises two folding portions attached to the flat holding portion along the top edge, residing on opposite sides of the vertical passage in the flat holding portion.

3. The holder of claim 2, wherein the two folding portions and the flat holding portion form a rectangle.

4. The holder of claim 2, wherein the two folding portions and the flat holding portion form a "T".

5. The holder of claim 2, wherein the two folding portions fold about 45 degrees away from the vertical.

6. The holder of claim 2, wherein the holder is made of cardboard.

7. The holder of claim 2, wherein the holder is made of a biodegradable material.

8. The holder of claim 2, wherein the holder is made of an absorbent material.

9. The holder of claim 2, wherein the holder is made of an absorbent biodegradable material.

10. The holder of claim 9, wherein the absorbent biodegradable material has a water impermeable material backing.

11. The holder of claim 2, wherein the vertical passage is between $3/8$ inches and $1/2$ inches wide.

12. The holder of claim 2, wherein the vertical passage is about $3/8$ inches wide.

13. The holder of claim 2, wherein the vertical passage is between two inches and three inches deep.

14. A frozen desert holder, comprising:
a flat holding portion having a top edge;
a vertical passage extending down through the top edge in the flat holding portion, the vertical passage $3/8$ inches wide and two inches deep; and
two folding portions pivotally attached to the flat holding portion along the top edge straddling the vertical passage, the two folding portions foldable to reside in a same plane as the flat holding portion, and foldable to separate laterally to block drips from a frozen desert held in the vertical passage from dripping onto a consumers hand, wherein the flat holding portion and the two folding portions form a "T" shape.

15. A frozen desert holder, comprising:
a flat holding portion having a top edge;
a vertical passage extending down through the top edge in the flat holding portion, the vertical passage $3/8$ inches wide and two inches deep; and
two folding portions pivotally attached to the flat holding portion along the top edge straddling the vertical passage, the two folding portions foldable to reside in a same plane as the flat holding portion, and foldable to separate laterally to block drips from a frozen desert held in the vertical passage from dripping onto a consumers hand, wherein the flat holding portion and the two folding portions form a "T" shape, wherein the holder is made from an absorbent biodegradable material.

* * * * *